US011192281B1

(12) United States Patent
Miller et al.

(10) Patent No.: US 11,192,281 B1
(45) Date of Patent: Dec. 7, 2021

(54) ROTARY MOLDING SYSTEMS AND COMPONENTS THEREOF

(71) Applicant: The Step2 Company, LLC, Streetsboro, OH (US)

(72) Inventors: Eric Jay Miller, Loudonville, OH (US); Matthew C. Brokaw, Belleville, OH (US); Richard Howard Goff, Jr., Hartville, OH (US)

(73) Assignee: The Step2 Company, LLC, Streetsboro, OH (US)

( * ) Notice: Subject to any disclaimer, the term of this patent is extended or adjusted under 35 U.S.C. 154(b) by 0 days.

(21) Appl. No.: 17/143,235

(22) Filed: Jan. 7, 2021

Related U.S. Application Data

(60) Provisional application No. 62/958,500, filed on Jan. 8, 2020.

(51) Int. Cl.
*B29C 33/20* (2006.01)
*B29C 41/38* (2006.01)
*B29C 41/04* (2006.01)

(52) U.S. Cl.
CPC .......... *B29C 33/202* (2013.01); *B29C 41/04* (2013.01); *B29C 41/38* (2013.01); *B29C 2033/207* (2013.01)

(58) Field of Classification Search
CPC ....... B29C 33/202; B29C 41/38; B29C 41/04; B29C 2043/3277
USPC ...................................................... 425/451.9
See application file for complete search history.

(56) References Cited

U.S. PATENT DOCUMENTS

| | | | | | |
|---|---|---|---|---|---|
| 2,957,202 | A | * | 10/1960 | Rekettye | B29C 33/36 425/183 |
| 3,016,573 | A | * | 1/1962 | Blue | B29C 41/06 425/430 |
| 3,309,439 | A | * | 3/1967 | Nonweiler | B29C 41/22 264/45.4 |
| 5,807,589 | A | * | 9/1998 | Defatte | B29C 33/305 264/311 |
| 5,869,109 | A | * | 2/1999 | Guzikowski | B29C 41/04 425/451.9 |
| 6,267,917 | B1 | * | 7/2001 | Guzikowski | B29C 33/30 264/297.6 |
| 6,322,348 | B1 | * | 11/2001 | Guzikowski | B29C 33/202 264/297.6 |

(Continued)

*Primary Examiner* — Matthew J Daniels
*Assistant Examiner* — Hana C Page
(74) *Attorney, Agent, or Firm* — Ulmer & Berne LLP

(57) ABSTRACT

A spider for a rotary molding process is provided. The spider includes an upper mold enclosure, a lower mold enclosure, and a clamping assembly. The lower mold enclosure is configured to selectively cooperate with the upper mold enclosure to facilitate retention of a mold housing therebetween. The clamping assembly comprises a collar, a plurality of brace members, and a clamping member. Each brace member is coupled with each of the collar and the upper mold enclosure. The clamping member is rotatably coupled with the lower mold enclosure and is rotatable about an axis in a clamping and unclamping direction. The axis extends through the collar. The collar is spaced from the upper mold enclosure along the axis. Rotation of the clamping member in the clamping direction facilitates translation of the collar towards the lower mold enclosure to facilitate urging of the upper mold enclosure and the lower mold enclosure together.

11 Claims, 13 Drawing Sheets

(56) References Cited

U.S. PATENT DOCUMENTS

2002/0187213 A1\* 12/2002 Durrant .................. B29C 41/06
                                                                         425/182

\* cited by examiner

ROTARY MOLDING SYSTEMS AND COMPONENTS THEREOF

REFERENCE TO RELATED APPLICATION

This application claims priority to U.S. provisional patent application Ser. No. 62/958,500, filed Jan. 8, 2020, and hereby incorporates this provisional patent application by reference herein in its entirety.

TECHNICAL FIELD

The systems and apparatuses described herein generally relate to rotary molding systems. The spider includes an upper mold enclosure, a lower mold enclosure, and a clamping assembly that facilitates selective urging of the upper and lower mold enclosures together.

BACKGROUND

Conventional rotary molding systems include a spider that surrounds at least one mold housing and is attached to spindle which is rotated and heated in an oven during a molding process. The spider includes an upper mold enclosure and a lower mold enclosure that cooperate together to support each mold housing therebetween. Each mold housing includes an upper mold portion that is coupled with the upper mold enclosure and a lower mold portion that is coupled with the lower mold enclosure. When the upper mold closure and the lower mold enclosure are assembled, the upper and lower portions of each mold housing mate together to form the mold housing. The upper and lower portions are held together with bolts or other fasteners that can make assembly and disassembly of the spider difficult and time consuming.

SUMMARY

A spider is provided is provided for a rotary molding process. The spider comprises an upper mold enclosure, a lower mold enclosure, a clamping assembly, and a locking assembly. The upper mold enclosure comprises an attachment member and a plurality of upper frame members. The lower mold enclosure comprises a plurality of lower frame members. The lower mold enclosure is configured to selectively cooperate with the upper mold enclosure to facilitate retention of a mold housing therebetween. The clamping assembly comprises a collar, a plurality of brace members, and a clamping member. Each brace member of the plurality of brace members is coupled with each of the collar and the upper mold enclosure. The clamping member is rotatably coupled with the lower mold enclosure and is rotatable about an axis in a clamping direction and an unclamping direction. The locking assembly is associated with the attachment member and comprises a tongue member and a base member. The axis extends through the collar. The collar is spaced from the upper mold enclosure along the axis. Rotation of the clamping member in the clamping direction facilitates translation of the collar towards the lower mold enclosure to facilitate urging of the upper mold enclosure and the lower mold enclosure together. The attachment member extends from one upper frame member of the plurality of upper frame members to facilitate attachment of a securement device thereto. The tongue member is pivotally coupled with the one upper frame member and is pivotable between an opened position and a closed position. The base member extends from one lower frame member of the plurality of lower frame members. Pivoting of the tongue member between the opened position and the closed position facilitates selective coupling between the tongue member and the base member.

BRIEF DESCRIPTION OF THE DRAWINGS

It is believed that certain embodiments will be better understood from the following description taken in conjunction with the accompanying drawings in which.

DETAILED DESCRIPTION

Figure 1:
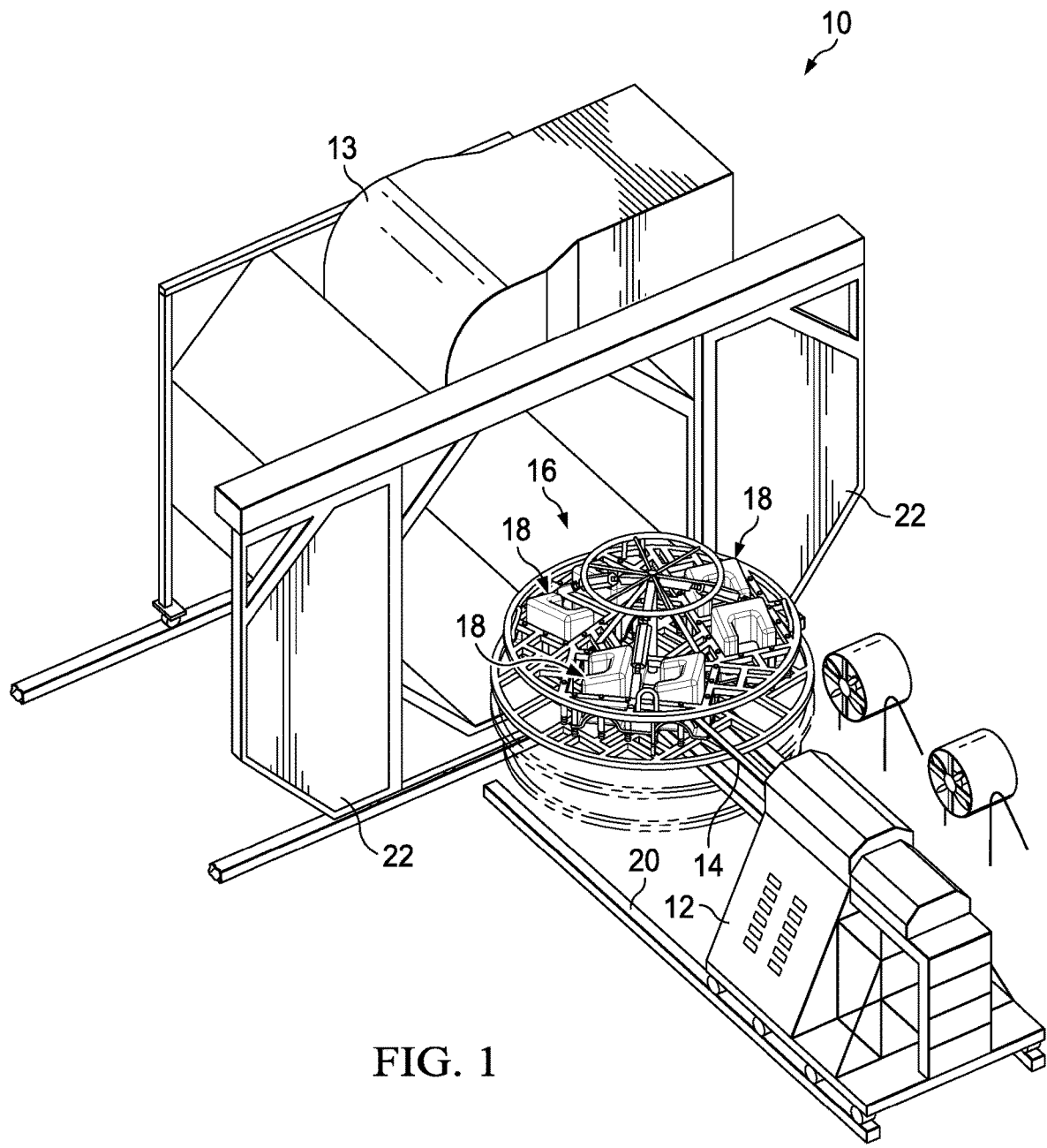
FIG. 1 is an isometric view depicting a rotary molding system comprising a spider, in accordance with one embodiment.

Selected embodiments are hereinafter described in detail in connection with the views and examples of FIGS. 1-13. As illustrated in FIG. 1, a rotary molding system 10 can include a shuttle 12 and an oven 13. The shuttle 12 can include a spindle 14 to which a spider 16 is secured. The spider 16 can support a plurality of molds 18. Another spider (shown in dashed lines) that supports another plurality of molds can be attached to the spindle 14 opposite the shuttle 12. When including two spiders, the two spiders can be similarly configured in one embodiment although, alternatively, two spiders of a rotary molding system can be different from one another. The shuttle 12 can be mounted on tracks 20 to selectively insert the spider 16 into the oven 13. When the spider 16 is inserted into the oven 13, a pair of doors 22 can be closed around the spindle 14 and the oven 13 can heat the molds 18. During heating of the molds 18, the spindle 14 can rotate the spider 16 and the molds 18 as part of the rotary molding process. While the rotary molding system 10 is shown to include two spiders, it is to be appreciated that the rotary molding system 10 can alternatively include one spider or more than two spiders. It is also to be appreciated that although a "shuttle-type" rotary molding system is illustrated, any of a variety of suitable alternative rotary molding systems are contemplated for use with the spider 16.

Figure 2:
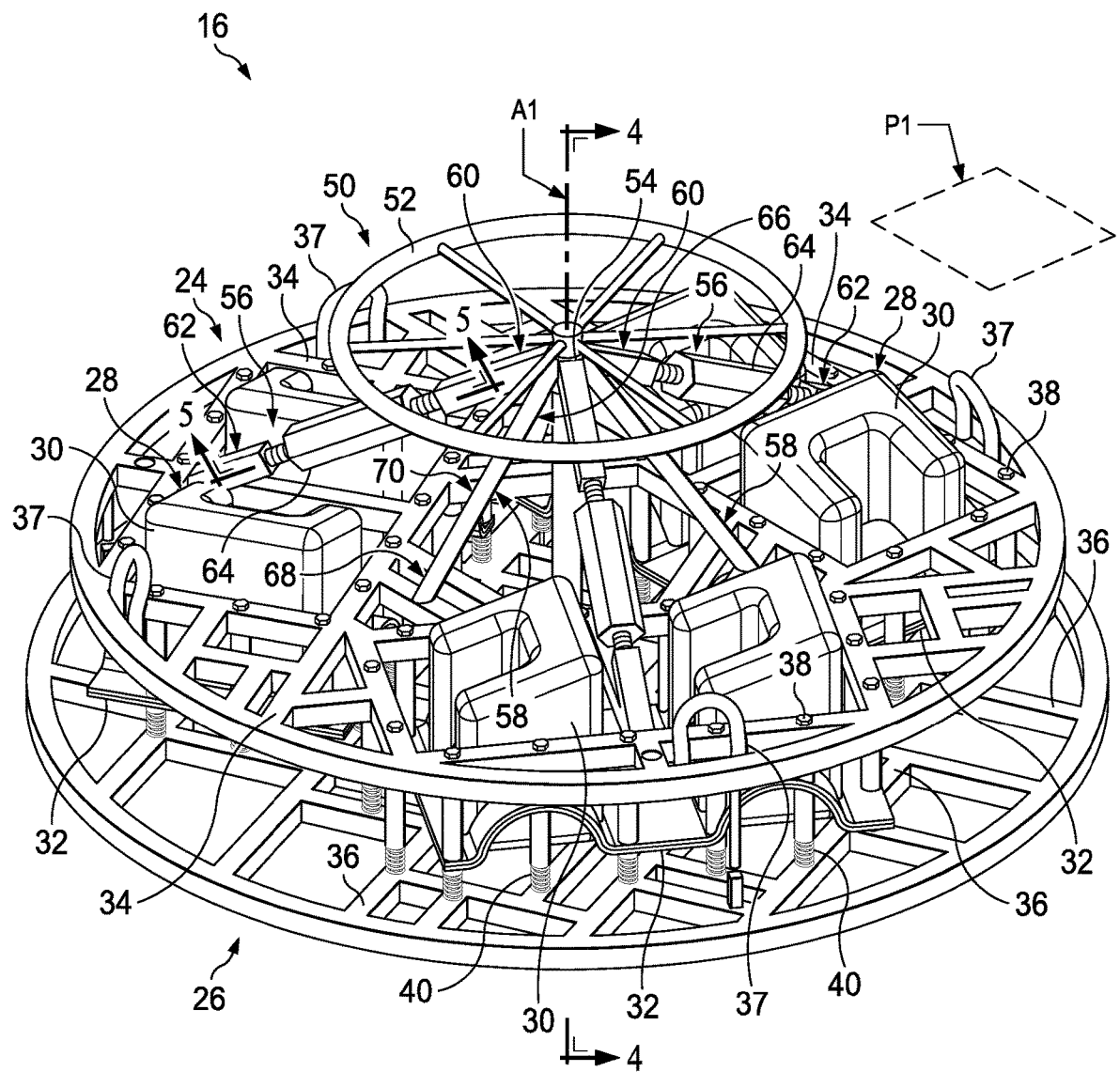
FIG. 2 is an isometric view depicting the spider of FIG. 1, apart from the remaining components of the rotary molding system.

Referring now to FIG. 2, the spider 16 can include an upper mold enclosure 24 and a lower mold enclosure 26 that cooperate to retain a plurality of mold housings 28 therebetween. Each mold housing 28 can include an upper portion 30 and a lower portion (e.g., 32). The upper portion 30 of each mold housing 28 can be coupled to the upper mold enclosure 24, and the lower portion (e.g., 32) of each mold housing 28 can be coupled to the lower mold enclosure 26. As will be described in further detail below, the upper mold enclosure 24 and the lower mold enclosure 26 can be selectively secured together to facilitate mating of each of the upper portions 30 with respective ones of the lower portions (e.g., 32) to form a respective mold cavity (not shown) therebetween.

The upper mold enclosure 24 can include a plurality of upper frame members 34 and the lower mold enclosure 26 can include a plurality of lower frame members 36. The upper and lower frame members 34, 36 can be formed of metal, such as, for example, steel or aluminum, or any of a variety of suitable alternative materials. A plurality of attachment members 37 can be coupled with the upper frame members 35 and arranged along an outer circumference of the upper mold enclosure 24. The attachment members 37 can be configured to accommodate a hook (or other securement device) for lifting of the spider 16 (e.g., with a hoist). It is to be appreciated that although four attachment members are illustrated, any quantity of attachment members can be provided on a spider. It is also to be appreciated that although the upper and lower mold enclosures 24, 26 are shown to be formed of respective upper and lower frame members (e.g., 34, 36), the upper and lower mold enclosures 24, 26 can be any of a variety of suitable alternative constructions that facilitate support of a portion of a mold housing.

Figure 3:
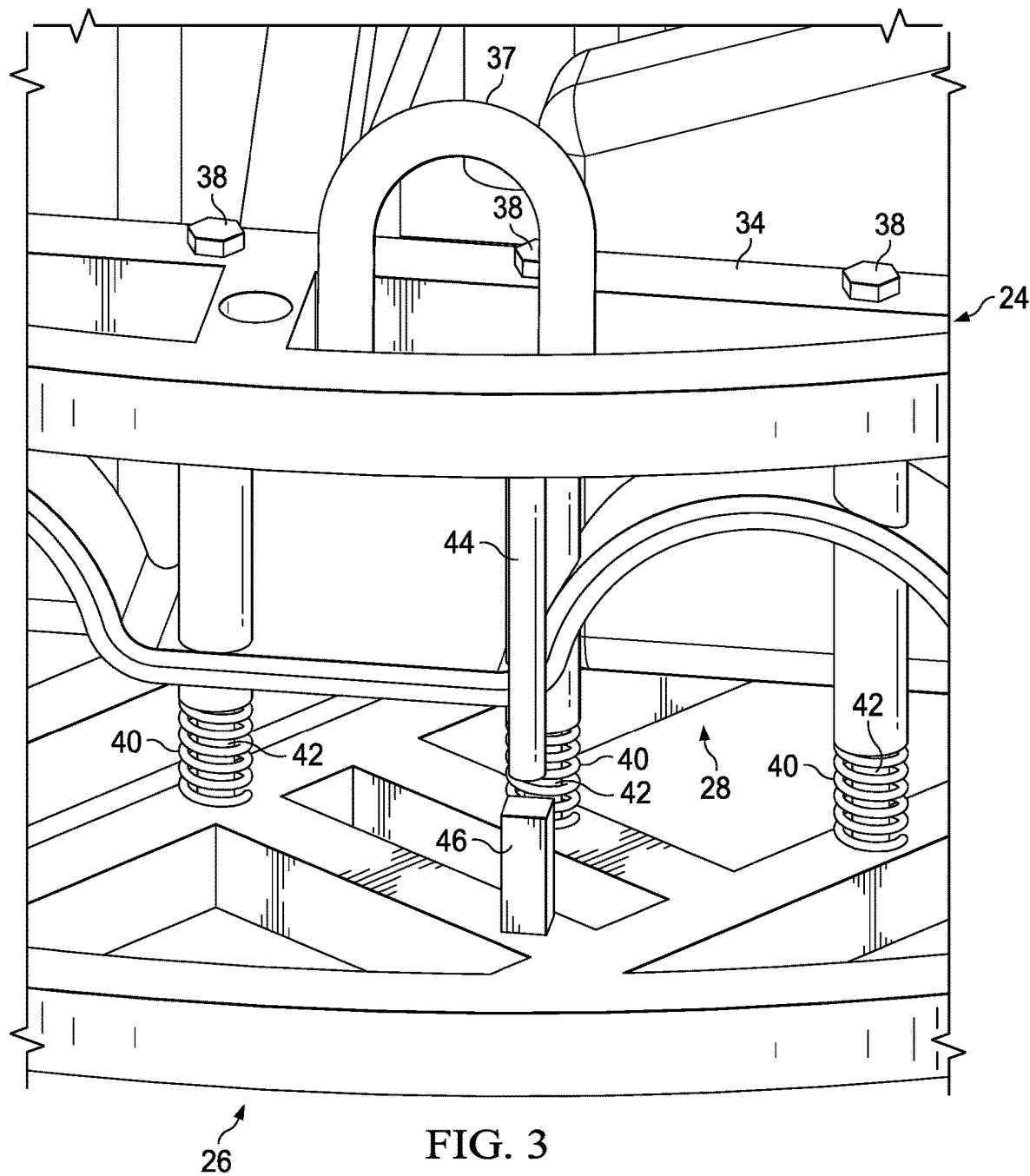
FIG. 3 is an enlarged isometric view depicting a portion of the spider of FIG. 1.

Each of the upper portions 30 of the mold housings 28 can be coupled with the upper frame members 34 with bolts 38. As illustrated in FIGS. 2 and 3, each of the lower portions 32 of the mold housings 28 can be supported on the lower frame members 36 by springs 40 and coupled thereto with bolts 42 (FIG. 3). When the upper and lower mold enclosures 24, 26 are secured together, as will be described in further detail below, the springs 40 can bias the upper and lower mold portions 30, 32 together to provide an effective seal therebetween. The upper and lower mold enclosures 24, 26 can include respective stop members 44, 46 that are configured to interact with one another to prevent excessive movement of the upper mold enclosure 24 towards the lower mold enclosure 26. Although the springs 40 are shown to be disposed beneath the mold housings 28, it is to be appreciated that springs can additionally or alternatively be disposed above the mold housings 28 between the mold housings 28 and the upper mold enclosure 24. It is also to be appreciated that the upper and lower portions 30, 32 of the mold housings 28 can be coupled with the upper and lower mold enclosures 24, 26, respectively, via any of a variety of other suitable alternative attachment methods, such as, via welding, for example.

Referring again to FIG. 2, the spider 16 can include a clamping assembly 50 that is configured to facilitate selective clamping of the upper mold enclosure 24 and the lower mold enclosure 26 together. The clamping assembly 50 can include hand wheel 52, a collar 54, a plurality of outer brace members 56, and a plurality of inner brace members 58. The hand wheel 52 can overlie the collar 54 and can be rotatable with respect the collar 54 about an axis A1 that extends through the collar 54. Each of the outer brace members 56 can include a proximal end 60, a distal end 62, and a turnbuckle 64 (e.g., a central portion) disposed between the proximal end 60 and the distal end 62. The proximal end 60 can be coupled with the collar 54, and the distal end 62 can be coupled with one of the upper frame members 34. Each of the inner brace members 58 can include a proximal end 66, a distal end 68, and a central portion 70 that is disposed between the proximal end 66 and the distal end 68. The proximal end 66 can be coupled with the collar 54 and the distal end 68 can be coupled with one of the upper frame members 34. In one embodiment, the proximal ends 60, 66 and the distal ends 62, 68 can be welded to the collar 54 and the upper frame members 34, respectively. It is to be appreciated that while the clamping assembly 50 is shown to include both outer and inner brace members 56, 58, a clamping assembly might only include inner brace members, might only include outer brace members, or might include some other combination of inner and outer brace members other than what is illustrated in FIGS. 1 and 2 (e.g., only one inner brace member and only one outer brace member). It is also to be appreciated that inner and outer brace members can be provided in any of a variety of other arrangements.

The collar 54 can be spaced from the upper mold enclosure 24 along the axis A1. The outer and inner brace members 56, 58 can accordingly be vertically angled with respect to the upper mold enclosure 24 such that the turnbuckles 64 of the outer brace members 56 and the central portions 70 of the inner brace members 58 are spaced from the upper mold enclosure 24. It is to be appreciated that the collar 54 being spaced from the upper mold enclosure 24 along the axis A1 can be understood to mean that the upper mold enclosure 24 and the collar 54 are on opposing sides of an imaginary plane P1 (FIGS. 2 and 4) that is perpendicular to the axis A1. It is also to be appreciated, that while the collar 54 is shown to be spaced a particular distance from the upper mold enclosure 24, the higher the collar 54 is spaced from the upper mold enclosure, the greater the force that can be applied by the outer and inner brace members 56, 58.

Figure 4:
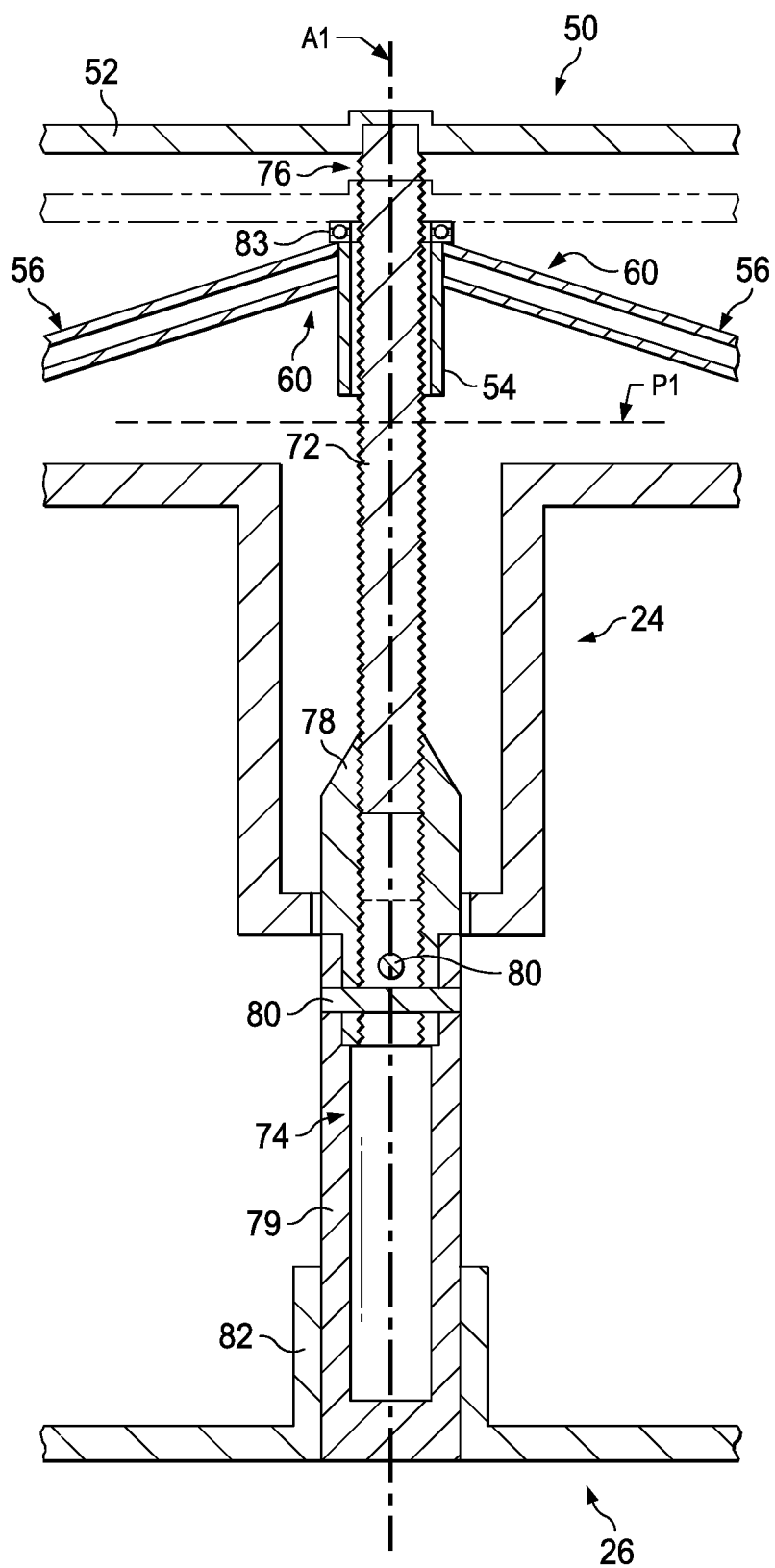
FIG. 4 is an enlarged cross-sectional view taken along the line 4-4 in FIG. 2.

The hand wheel 52 can be rotatably coupled with the lower mold enclosure 26 and rotatable in either of a clamping direction and an unclamping direction. Referring now to FIG. 4, the clamping assembly 50 can include a threaded member 72 that extends through each of the upper mold enclosure 24 and the collar 54 and facilitates rotatable coupling of the hand wheel 52 with the lower mold enclosure 26. The threaded member 72 can include a lower end 74 and an upper end 76. The lower end 74 can be threadably coupled with a coupling 78 that is attached to a mounting stem 79 of the lower mold enclosure 26. In one embodiment, the coupling 78 can extend into the lower end 74 and can be affixed thereto by a pair of pins 80 that extend through each of the coupling 78 and the lower end 74. It is to be appreciated that the coupling 78 and the lower end 74 can be coupled together with a bolt or any of a variety of suitable alternative coupling arrangements. The lower mold enclosure 26 can include a collar portion 82. The mounting stem 79 can extend into the collar portion 82 and can be affixed thereto by welding, with pins (not shown), with a bolt (not shown) or any of a variety of suitable alternative coupling arrangements.

The upper end 76 of the threaded member 72 can be coupled to the hand wheel 52 (e.g., through welding) such that the hand wheel 52 and the threaded member 72 rotate together in each of the clamping direction and an unclamping direction. As will be described in further detail below, when the hand wheel 52 is rotated in the clamping direction (e.g., clockwise) about the axis A1, the threaded member 72 can be threaded into the coupling 78 which can apply a downward force on the collar 54 to facilitate clamping of the upper and lower mold enclosures 24, 26 together. When the hand wheel 52 is rotated in the unclamping direction (e.g., counter clockwise), the threaded member 72 can be threaded out of the coupling 78 which can release the collar 54 from pressure from the hand wheel 52 to facilitate unclamping of the upper and lower mold enclosures 24, 26 from one another. A thrust bearing 83 can be interposed between the hand wheel 52 and the collar 54 to provide a journalled interface therebetween which can allow the hand wheel 52 to be easily rotated into and out of engagement with the collar 54 by reducing rotation friction during rotation of the hand wheel 52.

Still referring to FIG. 4, the hand wheel 52 is shown in solid lines to be spaced from the collar 54 such that the upper and lower mold enclosures 24, 26 are not fully clamped together. When the hand wheel 52 is rotated in the clamping direction, the hand wheel 52 can engage the thrust bearing 83 (as illustrated in dashed lines). As the hand wheel 52 is further rotated in the clamping direction, the hand wheel 52 can facilitate translation of the collar 54 towards the lower mold enclosure 26 (e.g., via the thrust bearing 83) to facilitate urging of the upper mold enclosure 24 and the lower mold enclosure 26 together. When the collar 54 is translated towards the lower mold enclosure 26, the downward force from the hand wheel 52 can be imparted to the upper mold enclosure 24 via the outer and inner brace members 56, 58. The force can accordingly be distributed along the upper mold enclosure 24 in such a manner to avoid excessive concentration of force at one area relative to the rest of the upper mold enclosure 24. In one embodiment, as illustrated in FIG. 2, the inner brace members 58 can be shorter than the outer brace members 56 such that the distal ends 68 of the inner brace members 58 are spaced radially inwardly (with respect to the axis A1) from the distal ends 62 of the outer brace members 56, thus facilitating distribution of force along the upper mold enclosure 24. It is to be appreciated that the attachment locations of the distal ends 62, 68 to the upper frame members 34 can be selected to provide force at desired locations along the upper mold enclosure 24. It is also to be appreciated that a combination of inner and outer braces (e.g., 56, 58) can be particularly useful for larger diameter spiders to effectively distribute the force at different radial positions along an upper mold enclosure.

The hand wheel 52 can also facilitate selective assembly and disassembly of the spider 16. When the spider 16 is disassembled, the lower mold enclosure 26 can remain coupled with the spindle 14 (FIG. 1). To facilitate assembly of the spider 16, the upper mold enclosure 24 can be aligned over the lower mold enclosure 26 (e.g., with a hoist) and the hand wheel 52 can be rotated in the clamping direction to begin threading the threaded member 72 into the coupling 78. Once a desired level of force is achieved, the spider 16 can be moved into the oven 13 by the spindle 14 (e.g., by the shuttle 12) to begin the rotary molding process. Once the rotary molding process is complete and the spider 16 has been removed from the spindle 14, the hand wheel 52 can be rotated in the unclamping direction to begin unthreading the threaded member 72 from the lower mold enclosure 26. Once the threaded member 72 is completely unthreaded from the lower mold enclosure 26 (e.g., the coupling 78), the upper and lower mold enclosures 24, 26 can be separated from one another to gain access to the molded components. Once the molded components have been removed from the spider 16, the mold housings 28 can be refilled with moldable material (e.g., thermoplastic powder) and the upper and lower mold enclosures 24, 26 can again be secured together with the hand wheel 52 to prepare the spider 16 for another rotary molding process.

Figure 5:
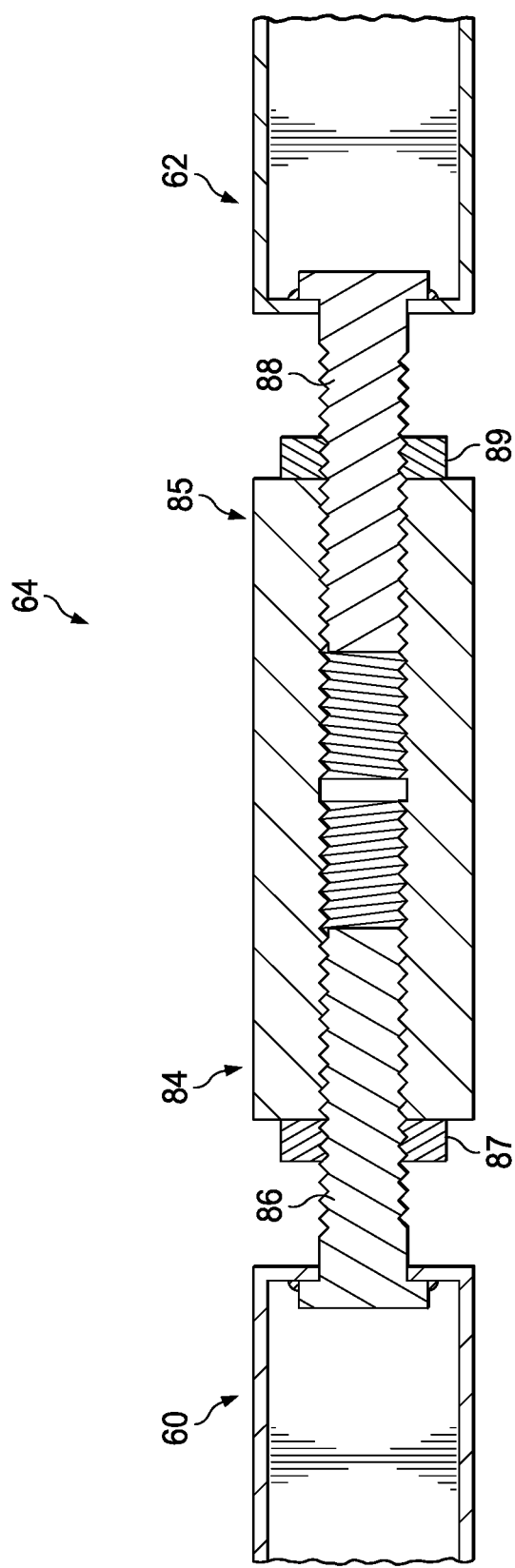
FIG. 5 is an enlarged cross-sectional view taken along the line 5-5 in FIG. 2.

Referring now to FIGS. 2 and 5, each turnbuckle 64 can be configured to selectively vary a length of respective ones of the outer brace members 56. Referring now to FIG. 5, one of the turnbuckles 64 is in association with the proximal and distal ends 60, 62 of the outer brace member 56 and is provided as a representative example of each of the turnbuckles 64 illustrated in FIG. 2. The turnbuckle 64 can be rotatably coupled with the proximal and distal ends 60, 62 of the outer brace member 56 and can be rotatable in an extending direction and a retracting direction. The turnbuckle 64 can include a proximal threaded portion 84 and a distal threaded portion 85 that are spaced from one another. The proximal end 60 of the outer brace member 56 can include a threaded stem 86 that is threadably coupled with the proximal threaded portion 84. The distal end 62 of the outer brace member 56 can include a threaded stem 88 that is threadably coupled with the distal threaded portion 85. In one embodiment, the threaded stems 86, 88 can be welded or otherwise rigidly affixed to the proximal and distal ends 60, 62, respectively. The proximal threaded portion 84 and the threaded stem 86 can be threaded oppositely from the distal threaded portion 85 and the threaded stem 88.

The turnbuckle 64 can be rotated in either the extending direction or the retracting direction (e.g., with a wrench or with a user's hands) to vary the length of the outer brace member 56, which can vary the amount of force imparted from the collar 54 to the upper mold enclosure 24. For example, when the turnbuckle 64 is rotated in the extending direction, each of the threaded stems 86, 88 can be threaded out of the proximal and distal threaded portions 84, 85 to lengthen the outer brace member 56 and increase the force imparted to the upper mold enclosure 24. When the turnbuckle 64 is rotated in the retracting direction, each of the threaded stems 86, 88 can be threaded into the proximal and distal threaded portions 84, 85 to shorten the outer brace member 56 thereby decreasing the force imparted to the upper mold enclosure 24. The turnbuckle 64 therefore facilitates manual adjustment of the force imparted from the collar 54 to the upper mold enclosure 24. It is to be appreciated that while each outer brace member 56 is shown to include a turnbuckle (e.g., 64), in some embodiments, fewer than all of the outer brace members 56 (e.g., only one of the outer brace members 56) might include a turnbuckle. In other embodiments, one or more of the inner brace members 58 can additionally or alternatively include a turnbuckle. It is also to be appreciated that while a turnbuckle (e.g., 64) is shown, it is to be appreciated any of a variety of other suitable mechanical arrangements can be implemented to facilitate selective shortening or lengthening of an individual brace member.

Once the length of the outer brace member 56 has been adjusted with the turnbuckle 64, the turnbuckle 64 can be selectively locked in place to prevent the length of the outer brace member 56 from inadvertently changing. In one embodiment, as illustrated in FIG. 5, each threaded stem 86, 88 can include a respective jam nut 87, 89 that can be threaded into engagement with the proximal and distal threaded portions 84, 85. In another embodiment, a wire (e.g., a speed wire) (not shown) can be routed through aligned holes in each of the turnbuckle 64 and one of the threaded stems 86, 88. In yet another embodiment, the turnbuckle 64 can be welded to the proximal end 60 and/or distal end 62 of the outer brace member 56. In still yet another embodiment, one of the threaded stems 86, 88 can be associated with a castle nut that is threaded against the turnbuckle 64 and selectively locked in place with a cotter pin. It is to be appreciated that the turnbuckle 64 can be provided with any of a variety of suitable alternative locking arrangements.

It is to be appreciated that the clamping assembly 50 can enable the upper and lower mold enclosures 24, 26 to be assembled and disassembled faster and with less manual effort than conventional arrangements. It is also to be appreciated that the clamping assembly 50 can distribute force among the mold housings 28 more consistently and can provide easier adjustment of the distribution of force than these conventional arrangements. One example of a conventional rotational molding apparatus (10) is illustrated in U.S. Pat. No. 5,306,564 and includes a top mounting frame (16) and a lower mounting frame (20) that cooperate to support a plurality of mold units (12). The top mounting frame (16) and the lower mounting frame (20) are secured together with a plurality of bolts (26) that are distributed along a periphery of the conventional rotational molding apparatus (10). When assembling or disassembling the conventional rotational molding apparatus (10), each bolt (26) must be individually rotated, either with a hand tool or a power tool, which can be time consuming and labor intensive. When the top mounting frame (16) and the lower mounting frame (20) are assembled together, the bolts (26) can be susceptible to being over torqued or under torqued which can create an imbalanced distribution of force among the mold units (12) thereby increasing the risk for imperfections and/or incomplete molding of the molded components. In addition, the proper torque for each of the bolts (26) can be difficult to replicate for each molding cycle which can result in inconsistencies among the molded components produced from different molding cycles. During disassembly, the bolts (26) are susceptible to being misplaced which can be costly and can cause delays in the molding process. In addition, there is a risk that at least one of the bolts (26) might remain threaded into the lower mounting frame (20) (e.g., due to the bolt (26) being overlooked or only partially unthreaded from the lower mounting frame (20)). In this instance, when the top mounting frame (16) is pulled away from the lower mounting frame (20), the unthreaded bolt(s) and/or the conventional rotational molding apparatus (10) can incur damage which can be costly to remediate.

The clamping assembly 50 described herein can be provided in lieu of bolts and can thus overcome many of the drawbacks associated with these conventional arrangements. For example, a user can assemble or disassemble the spider 16 with the hand wheel 52 in significantly less time than would be required to address a plurality of bolts. In addition, a user can manually rotate the hand wheel 52 with significantly less effort than would be required to manually rotate bolts with a hand tool or impact wrench. In one embodiment, the hand wheel 52 can be formed of a solid material (e.g., solid steel) which can enhance the weight (e.g., inertia) of the hand wheel 52 to encourage the hand wheel 52 to spin freely after initially being rotated by a user. During disassembly, if the threaded member 72 is not fully unthreaded from the lower mold enclosure 26 and the upper mold enclosure 24 is pulled away from the lower mold enclosure 26, the risk of damage to either of the upper or lower mold enclosures 24, 26 is significantly less than when using bolts. When the upper mold enclosure 24 is removed from the lower mold enclosure 26, the clamping assembly 50 can remain with the upper mold enclosure 24 and is thus not susceptible to being misplaced. These efficiencies can be especially realized for faster molding process where the spider 16 is being assembled and disassembled multiple times per hour.

It is to be appreciated that the turnbuckles 64 can allow for regular adjustments to be made to the distribution of force throughout the molding process. For example, during commissioning of the spider 16 (i.e., before the spider 16 is first used in a molding process), the upper and lower mold enclosures 24, 26 can initially be assembled together and the turnbuckles 64 can be rotated to adjust the distribution of force along the upper mold enclosure 24. During rotation of the turnbuckles 64, the compression of the springs 40 can be visually inspected to determine whether the upper and lower portions 30, 32 of the mold housings 28 are being compressed together properly. Once a proper distribution of force has been achieved, the turnbuckles 64 can be locked in place and the spider 16 can be placed in service. During the molding process, the clamping assembly 50 can apply a substantially consistent distribution of force among the mold housings 28 each time the spider 16 is assembled. Periodically during the molding process, the compression of the springs 40 can be visually inspected to determine whether the clamping assembly 50 is still applying a proper distribution of force to the mold housings 28. If an anomaly is detected, the turnbuckle(s) 64 associated with the anomaly can be unlocked and adjusted until the anomaly has been remediated and then the turnbuckle 64 can be locked again. The turnbuckles 64 can therefore allow the distribution of force to be easily and quickly adjusted during a molding process without the use of shims to allow the distribution of force to be applied more consistently through the molding process than conventional arrangements. It is to be appreciated that although three turnbuckles 64 are illustrated in FIG. 2, any quantity (one, two, or more than three) of turnbuckles 64 can be provided.

Figure 6:
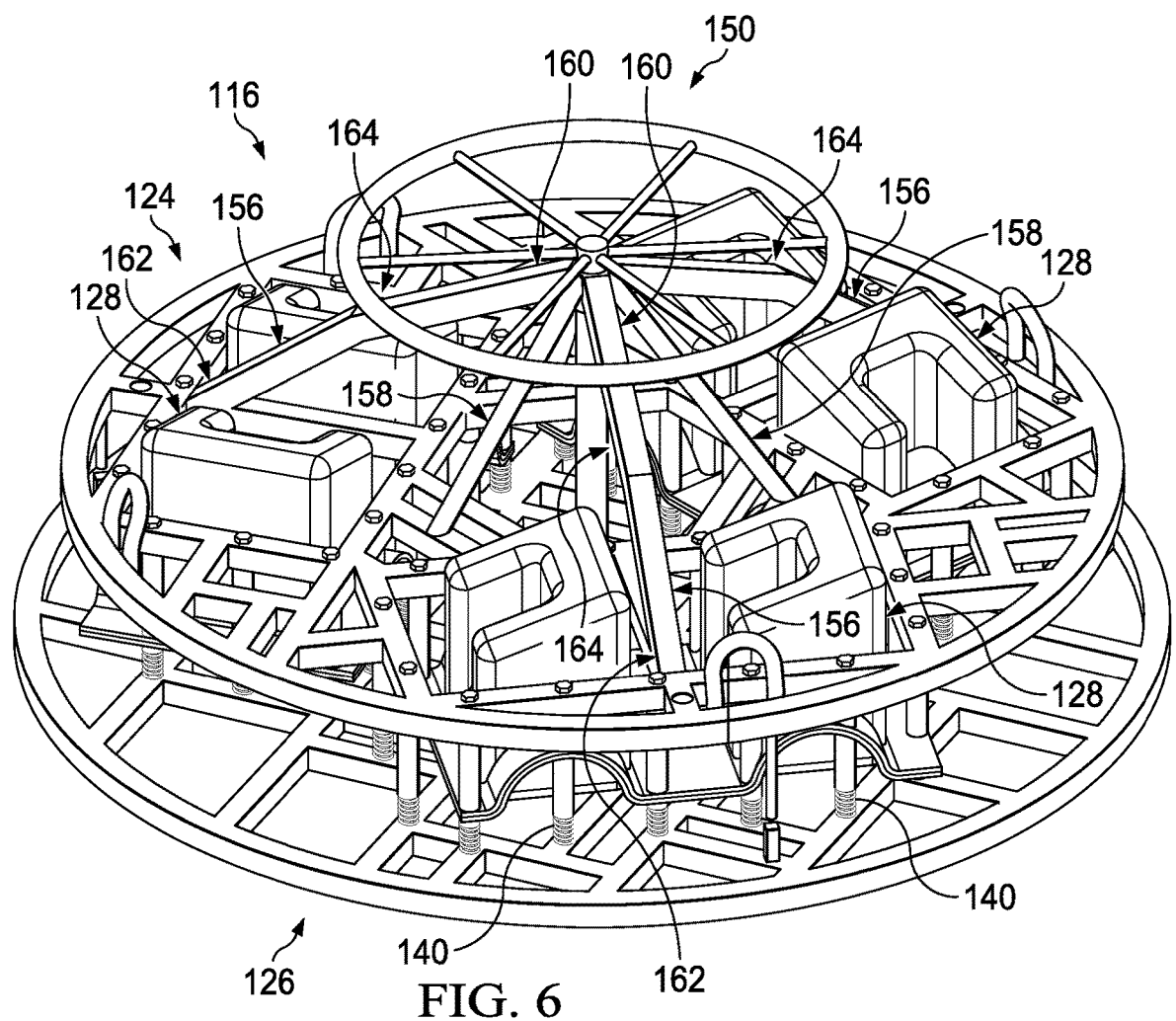
FIG. 6 is an isometric view depicting a spider, in accordance with another embodiment.

FIG. 6 illustrates an alternative embodiment of a spider 116 that is similar to, or the same in many respects as, the spider 16 illustrated in FIGS. 1-5. For example, the spider 116 can include an upper mold enclosure 124, a lower mold enclosure 126, and a clamping assembly 150 that includes a plurality of outer brace members 156 and a plurality of inner brace members 158. The upper and lower mold enclosures 124, 126 can cooperate to support a plurality of mold housings 128 that are supported with respect to the lower mold enclosure by springs 140. Each of the outer brace members 156 can include a proximal end 160, a distal end 162, and a central portion 164 disposed between the proximal end 160 and the distal end 162. However, each of the central portions 164 can be substantially rigid such that the outer brace members 156 have a fixed length. In such an embodiment, the length of the outer brace members 156 can be selected to achieve a desired distribution of force to the upper mold enclosure 124. In one embodiment, as illustrated in FIG. 6, each of the central portions 164 can be provided in a bent arrangement which can enhance the strength of the outer brace members 156. It is to be appreciated that for the embodiment illustrated in FIG. 6, the distribution of force can be adjusted by shimming any of the mold housings 128 at the springs 140.

Figure 7:
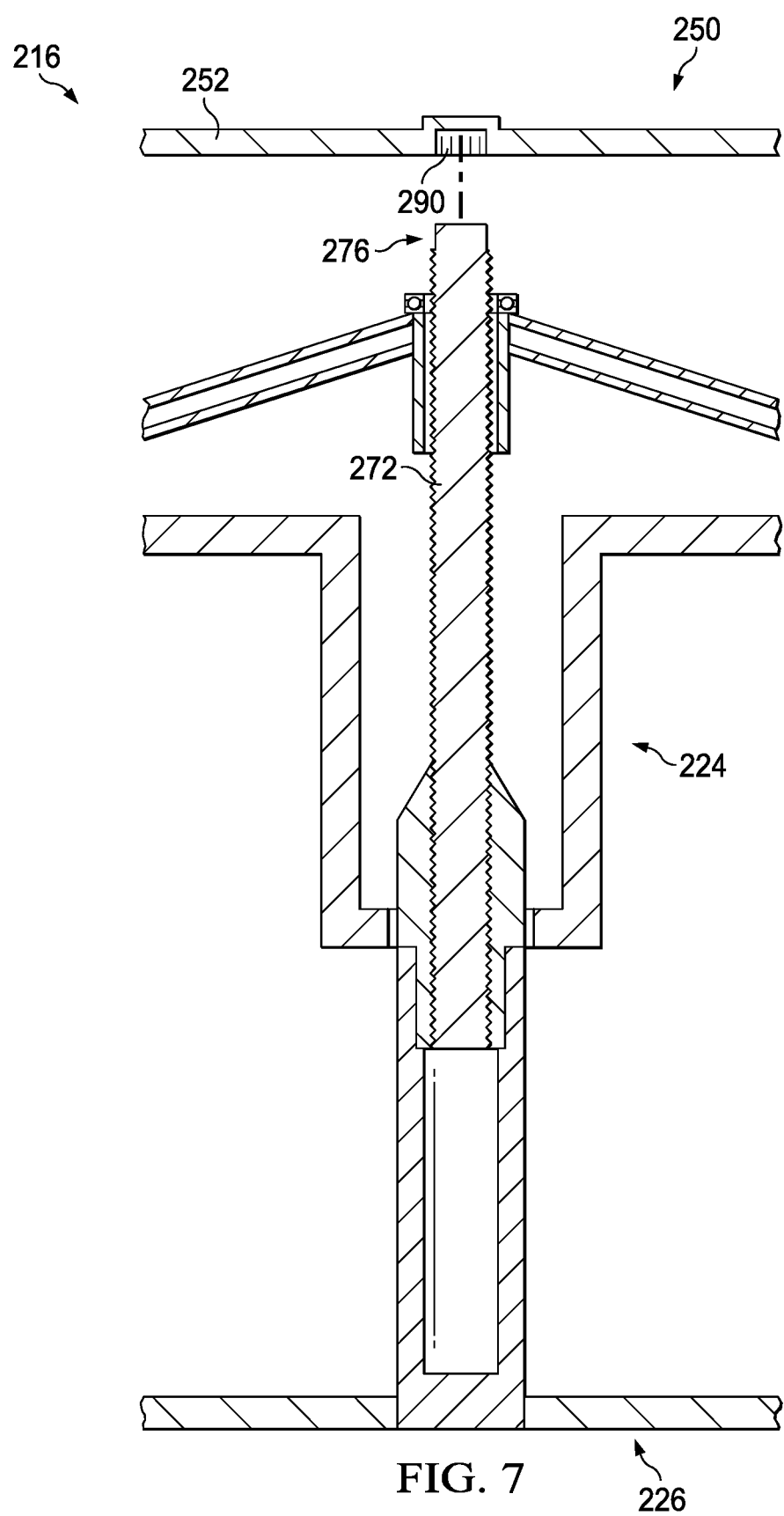
FIG. 7 is a cross-sectional view depicting a portion of a spider, in accordance with yet another embodiment.

FIG. 7 illustrates an alternative embodiment of a spider 216 that is similar to, or the same in many respects as, the spider 16 illustrated in FIGS. 1-5. For example, the spider 216 can include an upper mold enclosure 224, a lower mold enclosure 226, and a clamping assembly 250 that includes a hand wheel 252 and a threaded member 272. However, the hand wheel 252 can be releasably coupled with an upper end 276 of the threaded member 272 to allow the hand wheel 252 to be selectively removed from the upper end 276 of the threaded member 272. In one embodiment, as illustrated in FIG. 7, the hand wheel 252 and the upper end 276 of the threaded member 272 can be splined together (e.g., via splines 290). It is to be appreciated that, for larger diameter spiders, the hand wheel 252 can be removed to allow the spider 216 to fit inside of the oven (e.g., 13).

Figure 8:
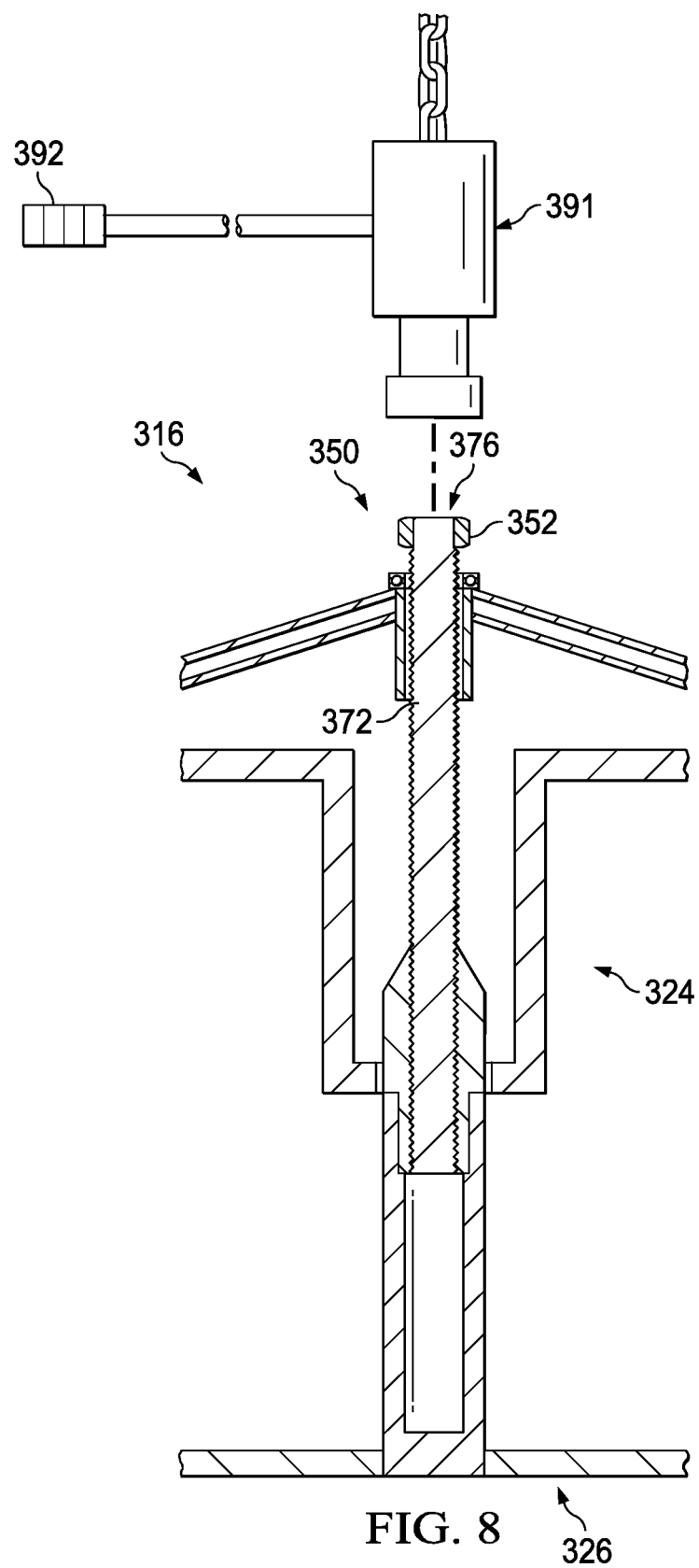
FIG. 8 is a cross-sectional view depicting a portion of a spider, in accordance with still yet another embodiment.

FIG. 8 illustrates an alternative embodiment of a spider 316 that is similar to, or the same in many respects as, the spider 16 illustrated in FIGS. 1-5. For example, the spider 316 can include an upper mold enclosure 324, a lower mold enclosure 326, and a clamping assembly 350 and a threaded member 372. However, a nut 352 can be attached to an upper end 376 of the threaded member 372. A powered torque wrench 391 can be provided that can selectively engage the nut 352 to facilitate powered rotation of the nut 352 and threaded stem 372 in either the clamping or unclamping direction. The powered torque wrench 391 can be suspended above the spider 316 and moved into place over the nut 352 (via a handle 392) to secure the powered torque wrench 391 onto the nut 352. The handle 392 can be held during operation of the powered torque wrench 391 to prevent the powered torque wrench 391 from spinning. It is to be appreciated that any of a variety of suitable alternative hand tools (e.g., a wrench) or power tools can be provided to facilitate rotation of the nut 352 and threaded member 372. It is also to be appreciated that, although a hand wheel (e.g., 52, 252) and a nut (e.g., 352) are described herein, any of a variety of suitable alternative clamping members are contemplated that can be selectively moved to facilitate translation of a collar towards a lower mold enclosure.

Figure 9:
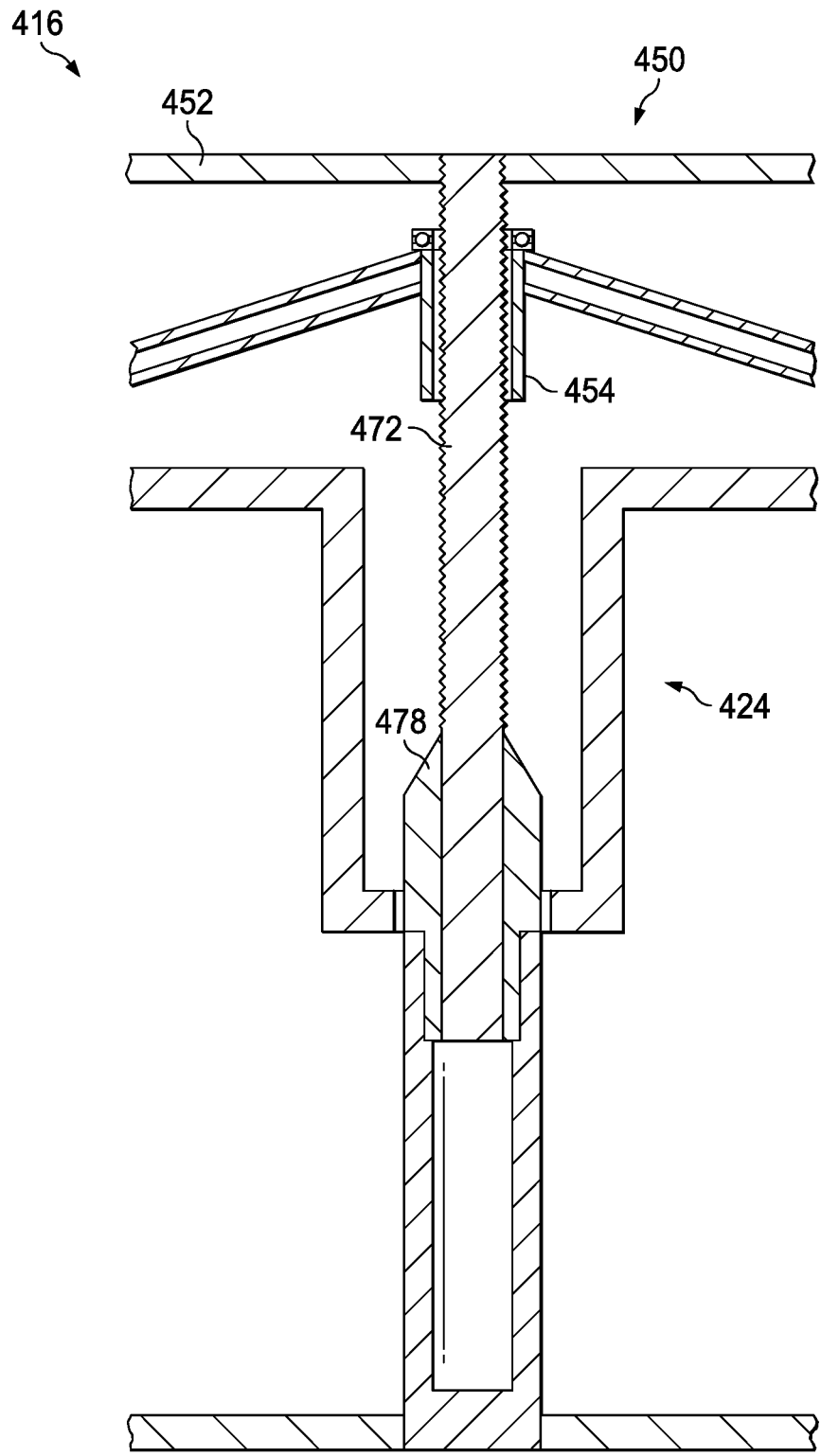
FIG. 9 is a cross-sectional view depicting a portion of a spider, in accordance with still yet another embodiment.

FIG. 9 illustrates an alternative embodiment of a spider 416 that is similar to, or the same in many respects as, the spider 16 illustrated in FIGS. 1-5. For example, the spider 416 can include an upper mold enclosure 424, a lower mold enclosure 426, and a clamping assembly 450 that includes a hand wheel 452, a collar 454, and a threaded member 472. However, the threaded member 472 can be rigidly coupled with the lower mold enclosure 426 (via a coupling 478), and the hand wheel 452 can be threaded onto, or otherwise rotatably coupled with, the threaded member 472 such that the hand wheel 452 is rotatable with respect the threaded member 472. When the hand wheel 452 is rotated in the clamping direction, the threaded member 472 can remain stationary and the hand wheel 452 can rotate about the threaded member 472 and into engagement with the collar 454 to facilitate translation urging of the collar 454 towards the lower mold enclosure 426.

Figure 10:
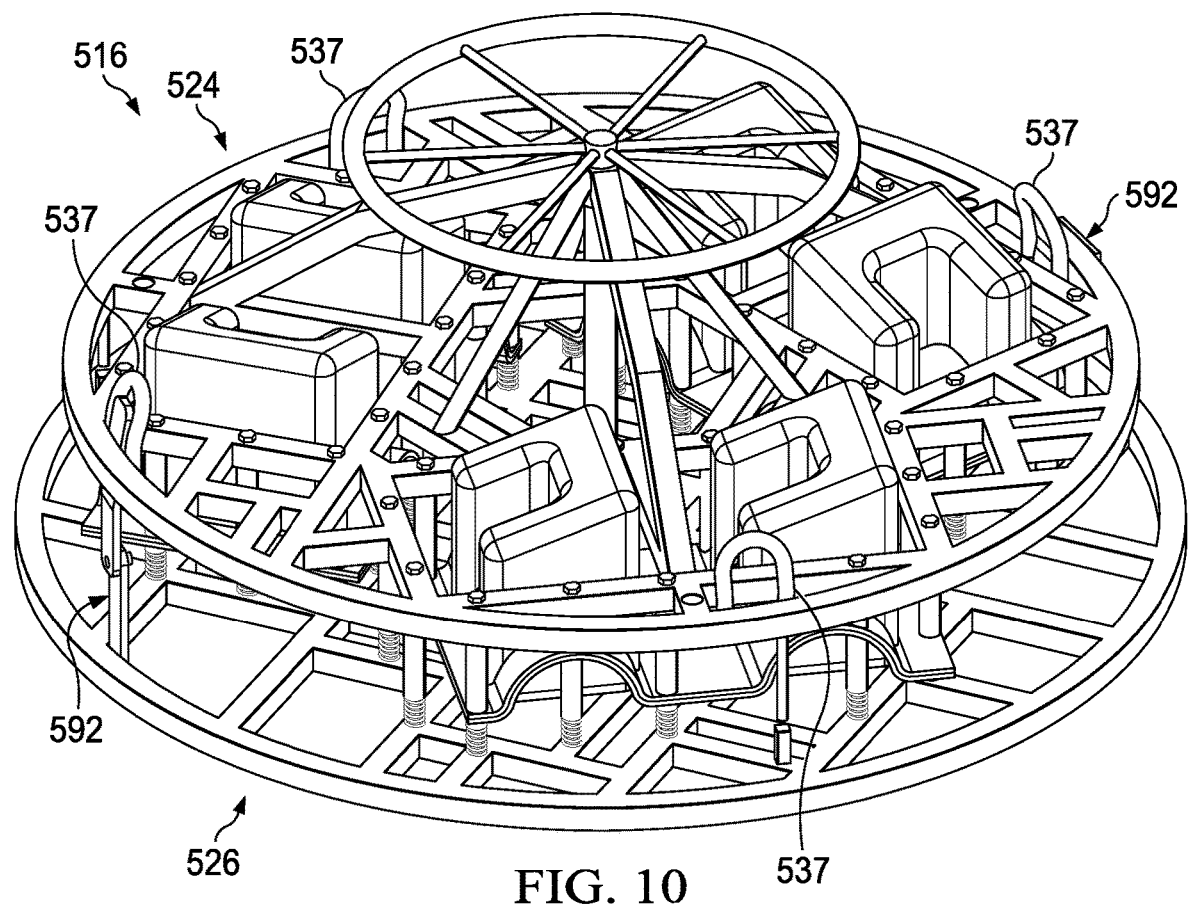
FIG. 10 is an isometric view depicting a spider, in accordance with another embodiment.
Figure 11:
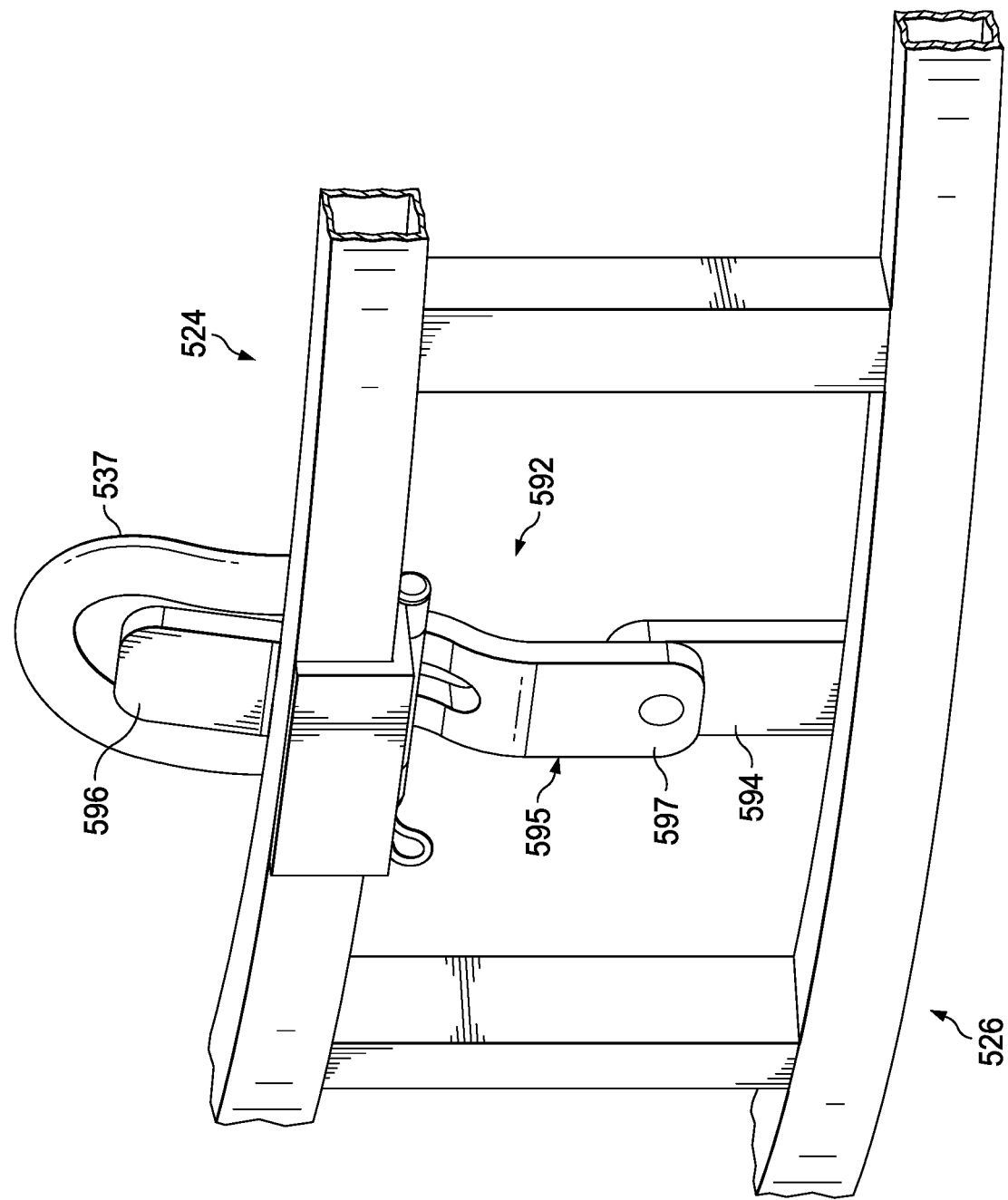
FIG. 11 is an enlarged front isometric view depicting an attachment member and a locking assembly of the spider of FIG. 10, with a tongue member shown in a closed position.
Figure 12:
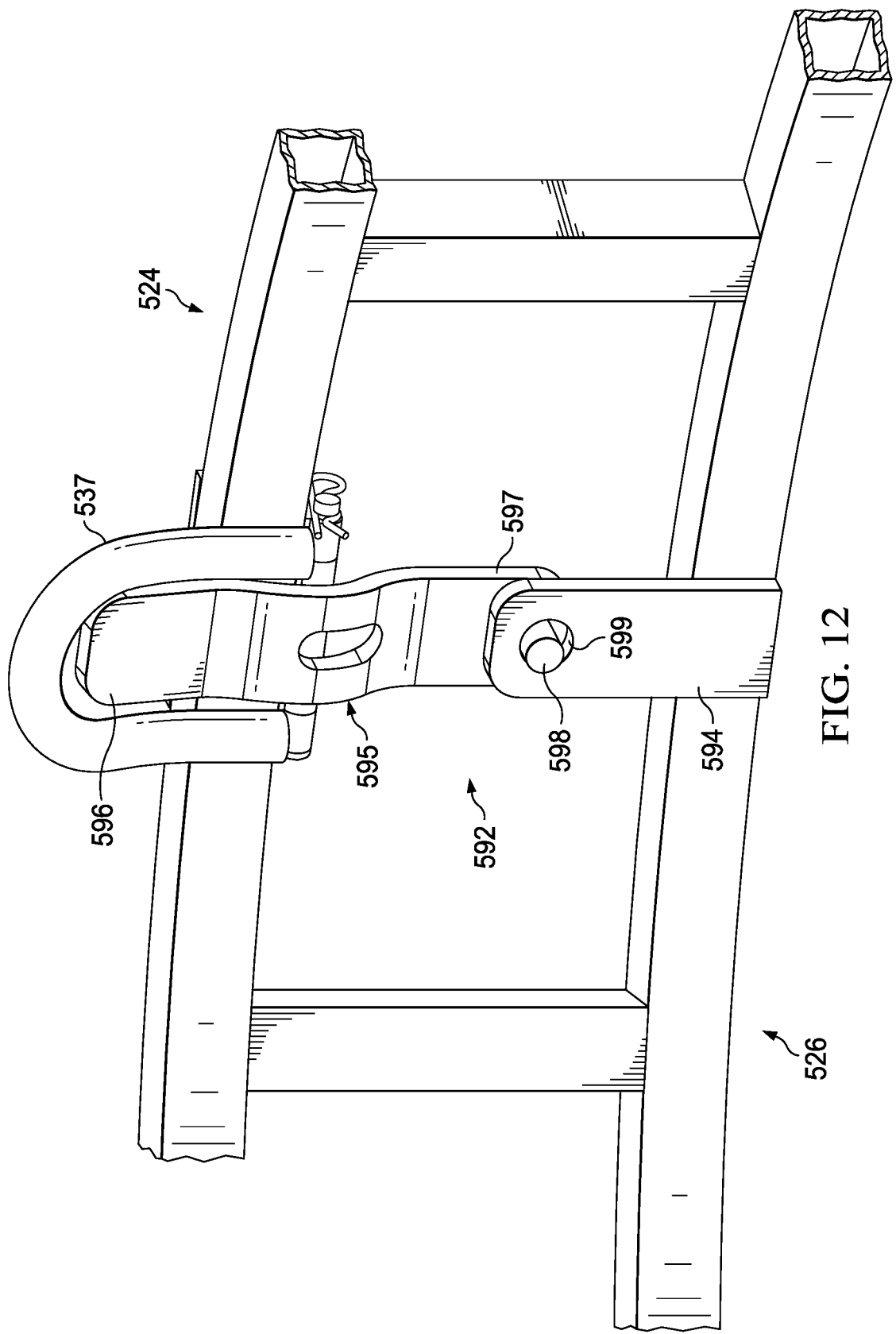
FIG. 12 is an enlarged rear isometric view depicting the attachment member and the locking assembly of FIG. 11.

FIGS. 10-13 illustrates an alternative embodiment of a spider 516 that is similar to, or the same in many respects as, the spider 16 illustrated in FIGS. 1-5. For example, as illustrated in FIG. 10, the spider 516 can include an upper mold enclosure 524, a lower mold enclosure 526, and a plurality of attachment members 537 arranged along the upper mold enclosure 524. However, respective locking assemblies 592 can be associated with two of the attachment members 537 to facilitate retention of a hook (e.g., 593 in FIG. 13) to the attachment members 537. Referring now to FIGS. 11 and 12, one of the locking assemblies 537 is illustrated as a representative example of both of the locking assemblies 537 illustrated in FIG. 10. As illustrated in FIGS. 11 and 12, the locking assembly 537 can include a base member 594 and a tongue member 595. The base member 594 can extend upwardly from the lower mold enclosure 526. The tongue member 595 can include an upper end 596 that selectively extends into the attachment member 537 and a lower end 597 that selectively overlaps a portion of the base member 594.

Figure 13:
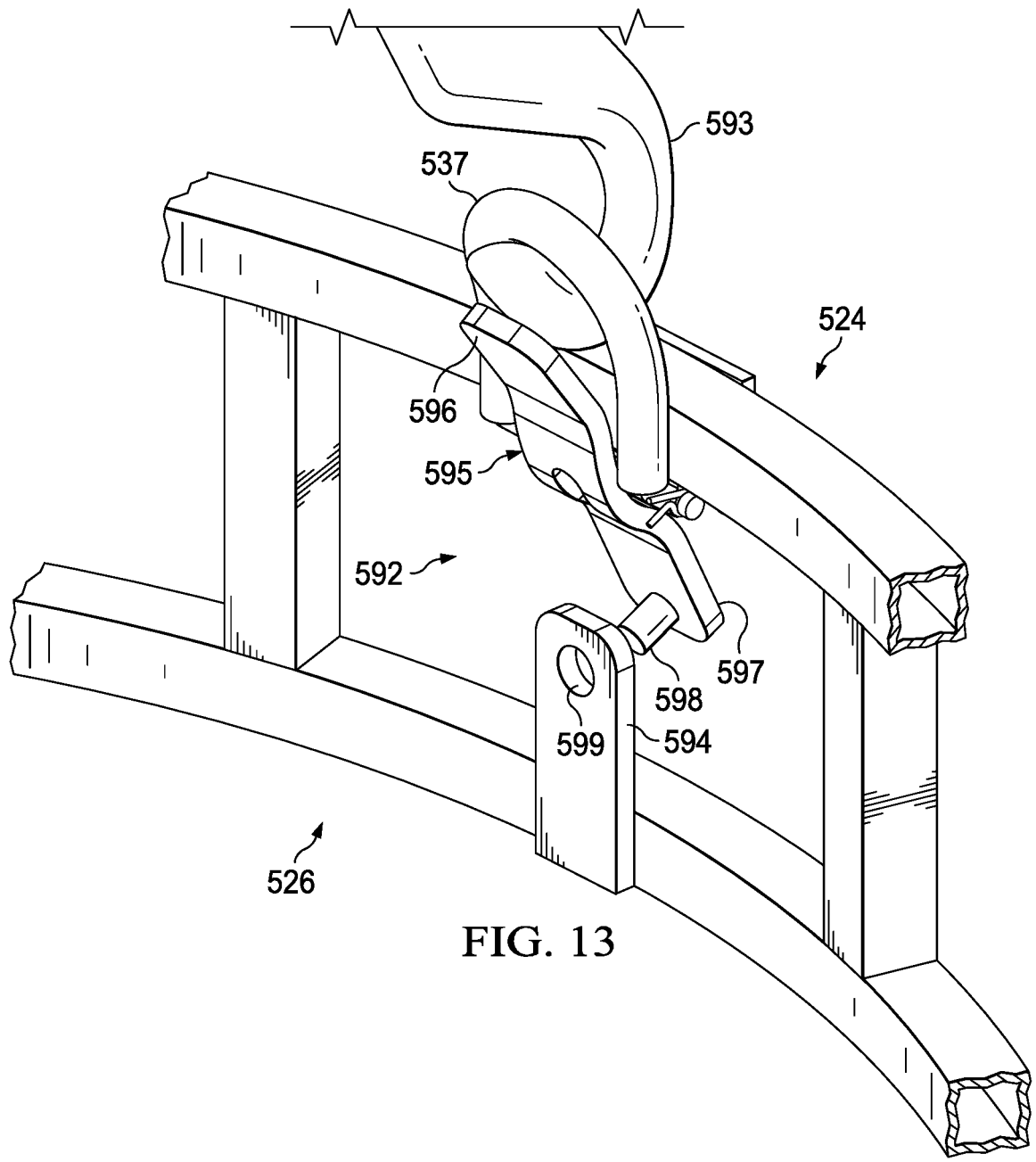
FIG. 13 is an enlarged rear isometric view depicting the attachment member and the locking assembly of FIG. 12, but with the tongue member shown in an opened position.

The tongue member 595 can be pivotally coupled with the upper mold enclosure 524 and pivotable between a closed position (FIGS. 11 and 12) and an opened position (FIG. 13). Insertion of the hook 593 into the attachment member 537 can facilitate pivoting of the tongue member 595 from the closed position to the opened position. For example, when the hook 593 is not inserted into the attachment member 537, as illustrated in FIGS. 11 and 12, the tongue member 595 can be in the closed position. A pin 598 provided on the lower end 597 can extend into an aperture 599 (FIG. 13) defined by the base member 594 to facilitate locking of the upper and lower mold enclosures 524, 526 together. When the hook 593 is inserted into the attachment member 537, the hook 593 can urge the tongue member 595 into the opened position which can pivot the lower end 597 away from the base member 594 such that the pin 598 is removed from the aperture 599. The tongue member 595 can be biased towards the closed position (e.g., by gravity and/or an internal spring (not shown)), such that the tongue member 595 can hold the hook 593 in place to prevent the hook 593 from inadvertently disconnecting from the attachment member 537 during assembly and lifting of the spider 516 (e.g., with a chain hoist). When the hook 593 is removed from the attachment member 537, the pin 598 of the tongue member 595 can interact with the aperture 599 to provide a visual indication of whether the upper and lower mold enclosures 524, 526 are properly clamped together. For example, if the upper and lower mold enclosures 524, 526 are not fully clamped together, the pin 598 and the aperture 599 can be misaligned thus preventing the tongue member 595 from moving to the closed position when the hook 593 is removed. It is to be appreciated that although the locking assemblies 592 are shown in FIG. 10 to be associated with two attachment members 537, a locking assembly can be associated with one or more than two members of a spider.

It is to be appreciated that while various specific clamping assemblies have been described herein for selectively assembling a spider and applying force to an upper mold enclosure, any of a variety of suitable alternative clamping assemblies are contemplated. It is also to be appreciated that although each spider has been shown include one clamping assembly, more than one clamping assembly can be provided on a spider in accordance with the principles described herein.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A spider for a rotary molding process, the spider comprising:
   an upper mold enclosure comprising an attachment member and a plurality of upper frame members;
   a lower mold enclosure comprising a plurality of lower frame members, wherein the lower mold enclosure is configured to selectively cooperate with the upper mold enclosure to facilitate retention of a mold housing therebetween;
   a clamping assembly comprising:
      a collar;
      a plurality of brace members, each brace member of the plurality of brace members being coupled with each of the collar and the upper mold enclosure; and
      a clamping member rotatably coupled with the lower mold enclosure and rotatable about an axis in a clamping direction and an unclamping direction; and
   a locking assembly associated with the attachment member and comprising a tongue member and a base member; wherein:
   the axis extends through the collar;
   the collar is spaced from the upper mold enclosure along the axis;
   rotation of the clamping member in the clamping direction facilitates translation of the collar towards the lower mold enclosure to facilitate urging of the upper mold enclosure and the lower mold enclosure together;
   the attachment member extends from one upper frame member of the plurality of upper frame members to facilitate attachment of a securement device thereto;
   the tongue member is pivotally coupled with the one upper frame member and is pivotable between an opened position and a closed position;
   the base member extends from one lower frame member of the plurality of lower frame members; and
   pivoting of the tongue member between the opened position and the closed position facilitates selective coupling between the tongue member and the base member.

2. The spider of claim 1 further comprising a threaded member coupled with the lower mold enclosure, wherein:
   the threaded member extends through each of the upper mold enclosure and the collar; and
   the clamping member is coupled with the threaded member.

3. The spider of claim 2 wherein the clamping member is rotatable together with the threaded member about the axis.

4. The spider of claim 2 wherein the clamping member is rotatably coupled with the threaded member and is rotatable with respect the threaded member about the axis.

5. The spider of claim 1 wherein the clamping member comprises a hand wheel.

6. The spider of claim 1 wherein:
   the plurality of brace members comprise a first brace member and a second brace member;
   the first brace member and the second brace member each comprise a first end, a second end, and a central portion disposed between the first end and the second end;
   the first end of the first brace member and the first end of the second brace member are each coupled with the collar;
   the second end of the first brace member and the second end of the second brace member are each coupled with the upper mold enclosure; and
   the respective central portions of the first brace member and the second brace member are spaced from the upper mold enclosure.

7. The spider of claim 6 wherein the first brace member is shorter than the second brace member such that the second end of the first brace member is spaced radially inwardly from the second end of the second brace member.

8. The spider of claim 1 wherein:
   the plurality of brace members comprises a first brace member and a second brace member;
   the first brace member comprises a first end, a second end, and the turnbuckle;
   the turnbuckle is disposed between the first end and the second end;
   the second brace member comprises a first end, a second end, and a central portion disposed between the first end and the second end;
   the first end of the first brace member and the first end of the second brace member are each coupled with the collar;
   the second end of the first brace member and the second end of the second brace member are each coupled with the upper mold enclosure; and
   the turnbuckle and the central portion are each spaced from the upper mold enclosure.

9. The spider of claim 8 wherein the second brace member is shorter than the first brace member such that the second end of the second brace member is spaced radially inwardly from the second end of the first brace member.

10. The spider of claim 1 wherein at least one of the lower mold enclosure and the upper mold enclosure comprises a stop member that is configured to prevent excessive movement of the upper mold enclosure toward the lower mold enclosure.

11. A rotary molding system comprising an oven and a shuttle in combination with the spider of claim 1, wherein:
   the shuttle comprises a spindle configured for selective rotation;
   the spider is selectively coupled with the spindle and is configured for selective rotation together with the spindle; and
   the shuttle is movable relative to the oven to facilitate selective insertion of the spider into the oven via the spindle.

* * * * *

UNITED STATES PATENT AND TRADEMARK OFFICE
CERTIFICATE OF CORRECTION

PATENT NO. : 11,192,281 B1
APPLICATION NO. : 17/143235
DATED : December 7, 2021
INVENTOR(S) : Eric Jay Miller et al.

Page 1 of 1

It is certified that error appears in the above-identified patent and that said Letters Patent is hereby corrected as shown below:

In the Claims

Column 12, Claim 8, Line 24, change "the turnbuckle" to --a turnbuckle--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*